US006073395A

United States Patent [19]

Fenelon

[11] Patent Number: 6,073,395

[45] Date of Patent: Jun. 13, 2000

[54] WINDOW LIFT MECHANISM

[76] Inventor: Paul J. Fenelon, 13 Inveraray, Nashville, Tenn. 37215

[21] Appl. No.: 08/762,447

[22] Filed: Dec. 9, 1996

[51] Int. Cl.[7] ................................ E05F 11/42; F03G 1/00

[52] U.S. Cl. ................................ 49/358; 49/349; 49/352; 74/89.19; 185/40 R

[58] Field of Search .............................. 49/362, 374, 375, 49/360, 361, 502, 349, 358; 160/189, 314, 191; 185/40 R; 74/89.17, 89.19

[56] References Cited

U.S. PATENT DOCUMENTS

| | | | |
|---|---|---|---|
| 1,480,453 | 1/1924 | Lane | 49/358 |
| 1,937,662 | 12/1933 | Nicholson . | |
| 2,291,275 | 7/1942 | Ackerman | 74/89.19 |
| 2,319,088 | 5/1943 | Roethel | 74/89.19 |
| 2,336,530 | 12/1943 | Chandler et al. . | |
| 2,345,594 | 4/1944 | Gardner | 49/358 |
| 2,365,454 | 12/1944 | Chandler et al. | 49/362 |
| 3,263,367 | 8/1966 | Tanaka . | |
| 3,659,466 | 5/1972 | Pickles . | |
| 3,706,163 | 12/1972 | Pickles . | |
| 3,706,236 | 12/1972 | Pickles . | |
| 3,736,702 | 6/1973 | Pickles . | |
| 4,167,834 | 9/1979 | Pickles . | |
| 4,168,595 | 9/1979 | Pickles et al. . | |
| 4,170,847 | 10/1979 | Pickles . | |
| 4,193,365 | 3/1980 | Blessing | 185/40 R |
| 4,229,906 | 10/1980 | Pickles . | |
| 4,235,117 | 11/1980 | Pickles . | |
| 4,389,818 | 6/1983 | Sakamoto . | |
| 4,400,913 | 8/1983 | Krantz et al. . | |
| 4,420,906 | 12/1983 | Pickles . | |
| 4,553,656 | 11/1985 | Pickles . | |
| 4,592,245 | 6/1986 | Pickles . | |
| 4,603,894 | 8/1986 | Osenkowski . | |
| 4,785,585 | 11/1988 | Grier et al. . | |
| 4,850,636 | 7/1989 | McLaren et al. . | |
| 4,905,413 | 3/1990 | Kuki et al. . | |
| 4,908,988 | 3/1990 | Yamamura et al. . | |
| 4,910,917 | 3/1990 | Brauer . | |
| 4,939,867 | 7/1990 | Harada et al. . | |
| 4,967,510 | 11/1990 | Torii et al. . | |
| 4,970,827 | 11/1990 | Djordjevic | 49/358 |
| 4,991,348 | 2/1991 | Yamamura et al. . | |
| 5,005,316 | 4/1991 | Hornivius . | |
| 5,022,184 | 6/1991 | Yamamura et al. . | |
| 5,174,066 | 12/1992 | Dupuy . | |
| 5,226,259 | 7/1993 | Yamagata et al. . | |
| 5,251,403 | 10/1993 | Compeau et al. . | |
| 5,307,704 | 5/1994 | Müller et al. . | |
| 5,308,129 | 5/1994 | Hlavaty . | |
| 5,308,138 | 5/1994 | Hlavaty . | |

(List continued on next page.)

FOREIGN PATENT DOCUMENTS

| | | |
|---|---|---|
| 5-86761 | 4/1993 | Japan . |
| 851436 | 10/1960 | United Kingdom . |
| WO 96/41087 | 6/1995 | WIPO . |
| 9737099 | 10/1997 | WIPO . |

OTHER PUBLICATIONS

Ford Marketing Corporation, Ford Customer Service Division, Service Technical Communications Department, 1973 Car Shop Manual, Sep., 1972, Dearborn, Michigan.

*Primary Examiner*—Daniel P. Stodola
*Assistant Examiner*—Curtis Cohen
*Attorney, Agent, or Firm*—Howard & Howard

[57] ABSTRACT

A window lift mechanism for raising and lowering a window in a vehicle door includes a support bracket mounted to the window and a motor supported on the support bracket. A vertical rack is mounted to the door and is positioned immediately adjacent the window, and a vertical guide track is also mounted to the door parallel to the rack and immediately adjacent the window. A pinion gear driven by the motor is supported on the support bracket and engaged with the rack to permit vertical movement of the window. A slide is supported on the support bracket and engaged with the guide track to provide support as the window is raised or lowered. Alternatively, a second rack and pinion are used instead of the guide track and slide.

45 Claims, 7 Drawing Sheets

U.S. PATENT DOCUMENTS

| | | | |
|---|---|---|---|
| 5,309,677 | 5/1994 | Kunert et al. . | |
| 5,351,443 | 10/1994 | Kimura et al. . | |
| 5,355,629 | 10/1994 | Kimura et al. . | |
| 5,367,832 | 11/1994 | Compeau et al. . | |
| 5,410,921 | 5/1995 | Deynet et al. . | |
| 5,425,206 | 6/1995 | Compeau et al. . | |
| 5,537,782 | 7/1996 | Klippert et al. | 49/358 |
| 5,647,171 | 7/1997 | Wirsing et al. | 49/502 |
| 5,721,669 | 2/1998 | Becker et al. | 74/89.17 |

WINDOW LIFT MECHANISM

TECHNICAL FIELD

The subject invention generally relates to an apparatus for moving a closure member, such as a window, into an open or closed position.

BACKGROUND ART

All modern automobiles include a window lift assembly for raising and lowering windows in the door of the vehicle. The most common type of window lift assembly incorporates a "scissor mechanism." As shown in FIG. 1, a scissor-type system includes a door 10, a window 12 vertically moveable within the door 10, a horizontal support bracket 14 on the window 12, and a scissor mechanism 16 supported on the door 10 and engaged with a track 17 on the support bracket 14. A sector rack 18 is supported on the scissor mechanism 16, and a pinion gear 20 supported on the door 10 is engaged with the sector rack 18. In vehicles with power windows, a worm gear 22 driven by a motor 24 is engaged with a driven gear 26 which, in turn, is operatively joined to the pinion gear 20. The motor 24, worm gear 22, and driven gear 26 are all mounted to the door 10 of the vehicle. In vehicles without power windows (not shown), the pinion gear is driven by a manual hand-crank.

Unfortunately, the scissor-type mechanism includes many drawbacks such as the large amount of space and numerous parts required. The scissor-type mechanism is also mechanically inefficient, prohibiting the use of light-weight materials and requiring the use of relatively large motors to drive the system. The large motors necessarily require increased space and electrical power and also increase the weight of the system. With the limited space in a scissor-type system, in order to provide the required torque transfer efficiency it is necessary to have a small diameter pinion gear, typically 0.5 to 0.75 inches, and relatively large driven gear, typically 1.8 to 2.5 inches in diameter, with a gear ratio between the worm gear and driven gear in the 40:1 to 60:1 range. This results in excessive worm gear speed in the range of 3000 to 4000 RPM which causes excessive driven gear tooth shock and armature noise. The combination of high torque, typically 80 to 125 inch-pounds at stall, and shock due to high worm speeds mandates that either expensive multiple gears and/or single driven gears with integral shock absorbers be utilized.

In U.S. Pat. No. 4,167,834 to Pickles, a more mechanically efficient vertical rack and pinion window lift system is disclosed. This type of system is represented in FIGS. 2 and 3 and includes a door 28, a window 30 vertically moveable within the door 28, a support bracket 32 on the window 30, a vertical rack 34 supported on the door 28, and a pinion gear 36 supported on the support bracket 32 in engagement with the rack 34. A motor 38 is supported on the support bracket 32 on the same side of the window 30 as the rack 34 and pinion gear 36 and drives the pinion gear 36 through a worm gear/driven gear transmission (not shown) engaged with the pinion gear 36. The pinion gear 36 is continually meshed with the rack 34 to drive the window 30 up and down. Obvious advantages of this system are the mechanical efficiency, fewer parts and, hence, reduced weight, and reduced motor size. The system is also more simple to install than the scissor-type system.

The Pickles window lift assembly, while theoretically plausible, does not function adequately due to the complex method and arrangement used to adapt the support bracket 32, motor 38, worm gear, and driven gear to the window 30. As discussed in U.S. Pat. No. 4,967,510 to Torii et al., in window lift systems of the type shown in FIGS. 2 and 3 (such as the Pickles system) a larger torque than necessary is required to drive the system due to the angular moment set up by the weight of motor 38 and related structure. In addition, more space than necessary is required due to the "superimposed sequential" stacking of components.

An additional problem with the Pickles system is that a guide member (not shown) is mounted to the support bracket 32 and surrounds the rack 34 to restrict relative movement between the rack 34 and the bracket 32. In addition, the motor 38, associated transmission housing (not shown), and pinion gear 36 are fixedly mounted to the bracket 32 such that the rack 34 and pinion gear 36 are integrally meshed and relative movement is prevented. By preventing any relative movement between the rack 34 and pinion gear 36, the system can bind up or at least provide added resistance to vertical movement, resulting in the need for a larger motor. Binding between a rack and pinion gear is a particular problem given that, as the window is driven upwardly, the window moves in side channels in the door which can place additional torque on the window due to irregularities in the side channels and in the window edges in contact with the side channels. The fact that the window is driven and guided from only a single point on the lower edge of the window further reduces the stability of the window.

The Pickles system also uses a large driven gear and surrounding housing to accommodate an integral, spring based, shock absorbing mechanism (not shown). The large driven gear together with a relatively small pinion mandates that a high motor speed be used, resulting in a noisy operation in order to close the window in a reasonable time frame, such as four seconds.

The system disclosed in the Torii et al. patent improved substantially over Pickles in its functional adaptability. The Torii system is represented in FIG. 4 and includes a window 40, a support bracket 42 on the window 40, a motor 44, a pinion gear 46, and a rack 48. To eliminate the angular moment on the window 40 caused by the weight of the motor 44, the Torii system positioned the motor 44 such that the center of gravity of the motor 44 was substantially aligned with the plane of movement of the window 40. However, as shown in FIG. 4, this arrangement prevents the rack 48 from being positioned as close as possible to the window 40, resulting in an increased angular moment on the window 40 caused by the torque generated at the rack/pinion gear interface acting upon a larger than necessary moment arm L. This angular moment can cause the window to "pull in" in the direction shown by the arrow labeled P.

Although not shown in FIG. 4, the Torii et al. system is similar to the Pickles system by including a guide track integrally joined with the rack and a slide engaged with the guide track and supported on the support bracket. Similar to the Pickles system, this arrangement prevents relative movement between the rack and pinion gear and can cause the system to bind up or provide added resistance to vertical movement. The window is also driven and guided from only a small area on the lower edge of the window which reduces the stability of the window in the same manner as discussed above for the Pickles system.

Therefore, it is desirable to provide a window lift system which includes the benefits of a rack and pinion system while providing smooth operation as the window is raised and lowered and minimizing the torque placed on the window.

SUMMARY OF THE INVENTION AND ADVANTAGES

In one embodiment of the present invention, a closure assembly is provided including a closure member, a motor positioned on a first side of the closure member, a rack positioned on a second side of the closure member and immediately adjacent the closure member, and a pinion gear supported on the closure member and engaged with the rack. By reducing the spacing between the rack and the closure member, this system reduces the moment placed on the closure member caused by the torque at the interface between the rack and pinion gear.

In another embodiment of the present invention, a closure assembly is provided including a closure member, a pinion gear supported by the closure member, a rack engaged with the pinion gear, a guide track non-integral with the rack and spaced from the rack, and a slide supported by the closure member and operatively engaged with the guide track. The guide track and rack are parallel in this embodiment. This system is advantageous by providing a guide track spaced from the rack to increase the stability of the closure member as the closure member is raised and lowered.

In another embodiment of the present invention, a closure assembly is provided including a second rack and second pinion gear in lieu of the guide track and slide of the embodiment discussed above. In this embodiment as well, the two separate racks provide added stability to the closure member as the closure member is raised and lowered.

In another embodiment of the present invention, a closure assembly is provided including a closure member, a pinion gear supported by the closure member, and a flexible rack operatively engaged with the pinion gear. The flexible rack is advantageous by permitting the rack to absorb some of the shock that would otherwise be placed on the rack and pinion when the closure member is stopped after being raised or lowered. The flexible rack also prevents jamming between the rack and pinion gear that might otherwise occur between a rigid rack and a pinion gear.

BRIEF DESCRIPTION OF THE DRAWINGS

Other advantages of the present invention will be readily appreciated from the following detailed description of the invention when considered in connection with the accompanying drawings wherein.

DETAILED DESCRIPTION OF THE PREFERRED EMBODIMENTS

Figure 6:
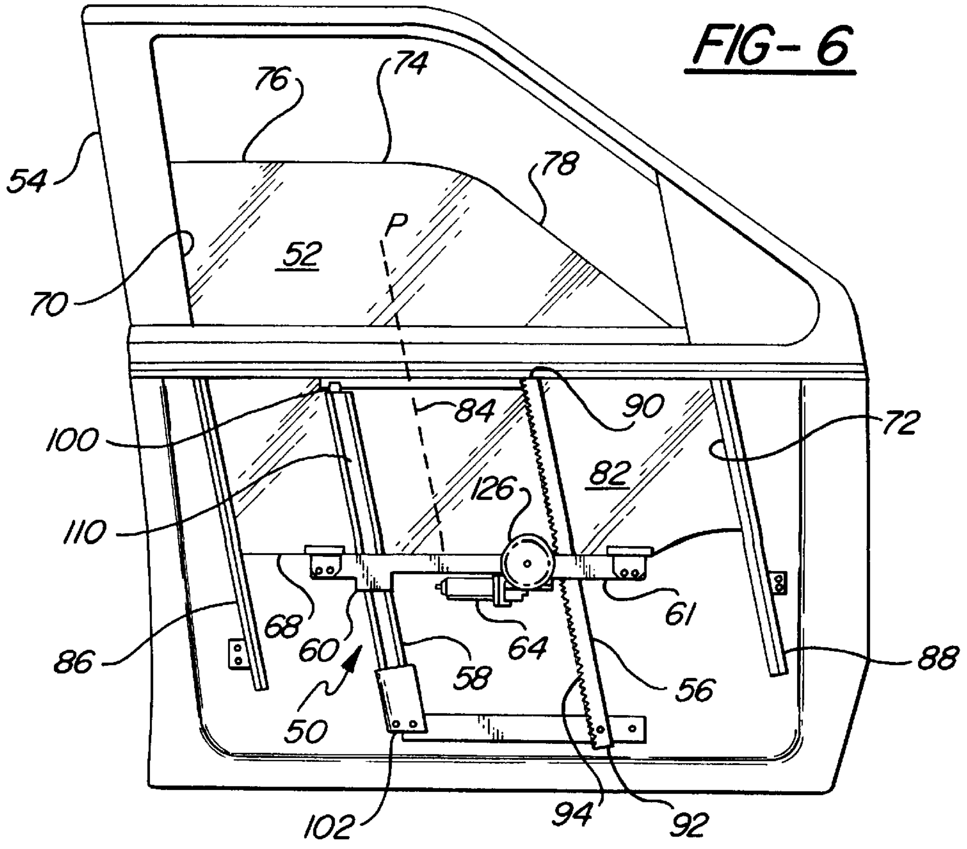
FIG. 6 is a first embodiment of the present invention including a separate guide track and a rack mounted to a vehicle door.
Figure 7:
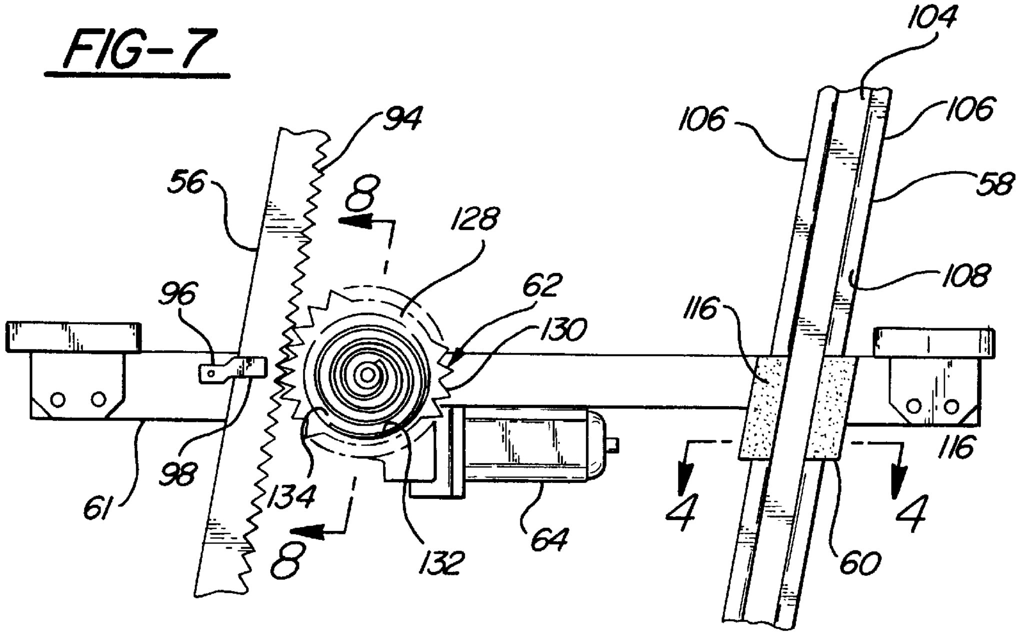
FIG. 7 is a close up view of the first embodiment of the present invention.

A first embodiment of the present invention is shown generally in FIGS. 6 and 7 and comprises a closure assembly 50 for moving a closure member into an open or closed position. The closure assembly 50 includes a closure member 52, such as a vehicle window 52, supported for vertical movement by a support frame 54, such as a vehicle door 54. A rack 56 is supported by the door 54 immediately adjacent the window 52 and extends substantially vertically. A guide track 58 is supported by the door 54 parallel to the rack 56 and spaced therefrom, and a slide 60 is supported by a support bracket 61 on the window 52 and is operatively engaged with the guide track 58. A pinion gear 62 is operatively engaged with the rack 56 and is indirectly supported by the support bracket 61 and located immediately adjacent the window 52. A motor 64 is also supported by the support bracket 61 and includes an output shaft 66 (shown in FIG. 10) operably connected to the pinion gear 62.

The window 52 includes a bottom edge 68, a first side edge 70, a second side edge 72, and a top edge 74. The top edge 74 includes a first segment 76 which is horizontal and a second segment 78 which tapers downwardly at an angle toward the second side edge 72. The bottom edge 68 is also horizontal and is parallel to the first segment 76 of the top edge 74. The first and second side edges 70,72 are parallel to each other but are skewed slightly with respect to the bottom edge 68 of the window 52 and are not perpendicular thereto. More specifically, the first side edge 70 forms an obtuse angle with respect to the bottom edge 68 and the second side edge 72 forms an acute angle with respect to the bottom edge 68. The window 52 is curved from the top edge 74 to the bottom edge 68 and includes a concave inner surface 80 and a convex outer surface 82. The window 52 includes a center of mass 84 with a plane P running through the center of mass 84 and parallel to the side edges 70 and 72 which bisects the window 52 into sections of equal weight.

The door 54 includes first and second guide slots 86,88 for guiding the first and second side edges 70,72 of the window 52, respectively, along a vertical movement path M (shown in FIG. 8) in either an upstroke or a downstroke. The guide slots 86,88 are parallel to the guide track 58, the rack 56, and the side edges 70,72 of the window 52. The structure of the guide slots 86,88 is well known in the art and need not be described in detail herein.

The rack 56 includes a top end 90 and a bottom end 92 which are each bolted to brackets 118 which are, in turn, securely mounted to door 54. As shown best in FIG. 8, the rack 56 is positioned on the concave side 80, or inside 80, of the window 52 and is curved from the top end 90 to the bottom end 92 to match the curvature of the window 52 such that a predetermined distance is maintained between the window 52 and the rack 56. Ideally, the rack 56 is maintained as close as possible to the window 52, preferably one-quarter inch or less from the window 52, for reasons that will be discussed in more detail below. Relative to the bottom edge 68 of the window 52, the rack 56 is facing the guide track 58 and positioned between the plane P and the second side edge 72 of the window 52 approximately 2–5 inches from the plane P.

Referring to FIG. 6, the rack 56 includes a vertical row of horizontal teeth 94 facing toward the first side edge 70 of the window 52 and is made of a flexible construction to permit the rack 56 to bend in a direction toward and away from the side edges 70,72 of the window 52 as well as in a direction perpendicular to the inner surface 80 of the window 52. The rack 56 is also moderately flexible in the lengthwise direction to allow the rack 56 to bend and absorb shock as the window 52 reaches a fully closed or open position. The rack 56 is maintained sufficiently rigid, however, to support the weight of the window 52 and to withstand the torque caused by the interaction between the pinion gear 62 and the rack 56 without buckling. Thus, the rack 56 could also be described as semi-rigid. An entirely rigid rack would require that the shock be totally absorbed by the teeth on the engaged rack and pinion gear requiring a more expensive and durable rack and pinion gear. The preferred material for the rack 56 is a reinforced injection moldable thermoplastic wherein the base resin (polymer) is preferably from a crystalline family like polyamide, polyacetal, or polyester.

To maintain the engagement between the rack 56 and pinion gear 62, a meshing bracket 96 is provided in the form of a simple Z shaped member as shown in the close-up view of FIG. 7. The meshing bracket 96 is mounted to the support bracket 61 and keeps the rack 56 and pinion gear 62 engaged by preventing the rack 56 from moving to the left, with reference to FIG. 7, and pulling away from the pinion gear 62. The meshing bracket 96 also includes a free end 98 supported adjacent the rack 56 which provides an outer boundary for relative movement between the rack 56 and pinion gear 62 caused by the rack 56 moving toward and away from the window 52 in a direction perpendicular to the inner and outer surfaces 80,82 thereof. To minimize friction between the meshing bracket 96 and the rack 56, surface contact should be minimized while lubricity should be maximized. Hence, the meshing bracket 96 should be adjacent the area of contact between the rack 56 and pinion gear 62 while being no wider than the area of contact, approximately the distance of separation of two rack teeth 94. The free end 98 of a Z shaped bracket must be spaced sufficiently from the rack 56 to allow the rack 56 to move in the thickness direction of the door (perpendicular to the inner and outer surfaces 80,82 of the window 52) to permit limited movement between the rack 56 and pinion gear 62. An L-shaped meshing bracket 96 without a free end 98 would also maintain the engagement between the rack 56 and pinion gear 62 but would not limit movement of the rack 56 toward and away from the window 52.

Similar to the rack 56, the guide track 58 as shown in FIGS. 6 and 7 and includes a top end 100 and a bottom end 102 which are each mounted to brackets 118 which are, in turn, securely bolted to the door 54. The guide track 58 is also positioned on the concave side 80, or inside 80, of the window 52 and is curved from the top end 100 to the bottom end 102 to match the curvature of the window 52. The guide track 58 is spaced from the rack 56 by approximately one-fourth the overall window width and is positioned between the plane P and the first side edge 70 of the window 52. Although not shown in the Figures, the guide track 58 may also be placed between the rack 56 and the second side edge 72 of the window 52. In such an arrangement, however, the orientation of the rack 56 must be reversed such that the teeth 94 face toward the second side edge 72 of the window 52 and toward the guide track 58.

Figure 9:
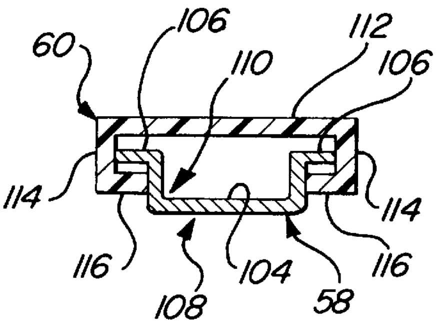
FIG. 9 is a sectional view of the guide track of the present invention.

As shown best in FIGS. 7 and 9, the guide track 58 includes a central channel 104 and two flanges 106 on opposite sides of the central channel 104 extending along the length of the track 58. The guide track 58 also includes a front side 108 facing the inner surface 80 of the window 52 and a back side 110. The slide 60 comprises a C-shaped member which surrounds the back side 110 of the guide track 58 and the flanges 106 thereon. More specifically, the slide 60 comprises a back plate 112 adjacent the back side 110 of the guide track 58, two side members 114 joined to the back plate 112, and two inwardly facing arms 116 joined to the side members 114. The flanges 106 on the guide track 58 have a predetermined thickness, and the spacing between the arms 116 and the back plate 112 is greater than the thickness of the flanges 106 to create tolerance in a direction perpendicular to the inner surface 80 of the window 52. However, the side members 114 are spaced such that there is only minimal tolerance between the flanges 106 and the slide 60 in a "side-to-side" direction parallel to the window 52 and perpendicular to the guide track 58.

As shown in FIG. 6, the rack 56 and guide track 58 are joined to mounting brackets 118 which are, in turn, joined to the door 54. The mounting brackets 118 enable the closure assembly 10 to be pre-assembled prior to installation by securing the rack 56 and guide track 58 to the mounting brackets 118 after engaging the slide 60 with the guide track 58 and the rack 56 with the pinion gear 62. In this manner, the closure assembly 10 can be installed by merely joining the mounting brackets 118 to the door 54 and joining the window 52 to the support bracket 61. The window 52 can also be secured to the support bracket 61 prior to installation of the closure assembly 10 within the vehicle door 54.

Figure 10:
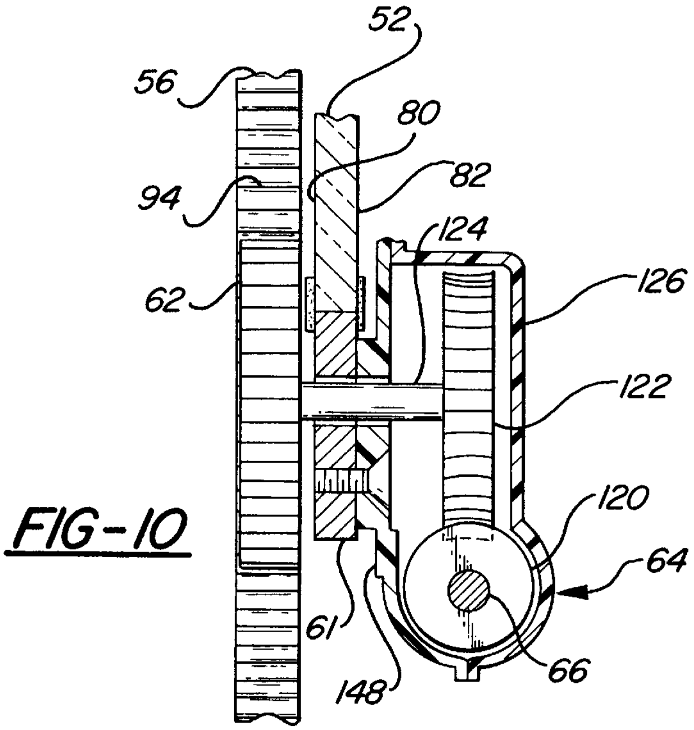
FIG. 10 is a cross-sectional view illustrating the motor assembly shown in FIG. 8.

As shown in the cross-sectional view of FIG. 10, the motor 64 includes an output shaft 66 with a worm gear 120 thereon in engagement with a driven gear 122. The driven gear 122 includes a central shaft 124 extending from the center of the driven gear 122 to the center of the pinion gear 62. The central shaft 124 coincides with the axis of rotation of the driven gear 122 and the pinion gear 62. The central shaft 124 is fixed to both the driven gear 122 and the pinion gear 62 such that the driven gear 122 and pinion gear 62 rotate together in unison at the same rate of rotation. A driven gear housing 126 surrounds the driven gear 122 and the worm gear 120 and is securely joined to the motor 64.

Figure 7A:
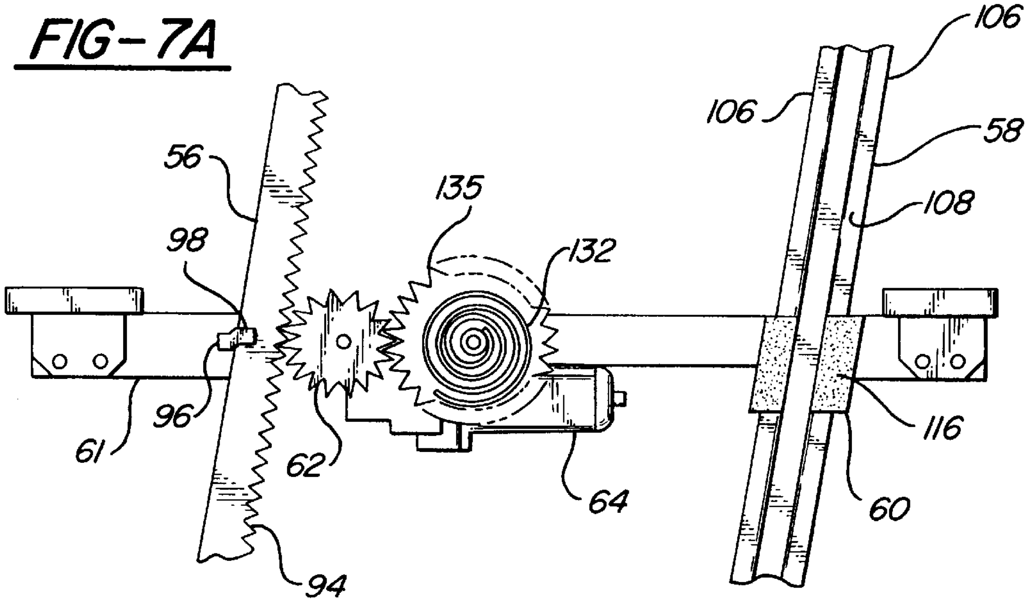
FIG. 7A is a close up view of the first embodiment of the present invention including a supplemental gear with a clock spring engaged with the pinion gear.

The pinion gear 62 includes an outer hub 128 having a plurality of gear teeth 130 positioned along the circumference of the hub 128 as shown in FIG. 7. The preferred material for the pinion gear 62 is a reinforced injection moldable thermoplastic wherein the base resin (polymer) is preferably from a crystalline family like polyamide, polyacetal, or polyester. In the preferred embodiment, the pinion gear 62 includes a clock spring 132 housed within a central cavity 134 in the pinion gear 62. The clock spring 132 provides supplemental torque to the pinion gear 62 during the upstroke of the window 52 to reduce the power output required by the motor 64 and, hence, the required size of the motor 64. The clock spring 132 includes a first end attached to the hub 128 of the pinion gear 62 and a second end attached to the central shaft 124 joining the pinion gear 62 to the driven gear 122. As shown in FIG. 7A, the clock spring 132 can also be mounted in a supplemental gear 135 engaged with the pinion gear 62. This embodiment provides the benefits of utilizing a clock spring 132 while providing more flexibility in selecting the size of the pinion gear 62. More specifically, a smaller pinion gear 62 can be used because the pinion gear 62 no longer contains the clock spring 132. The sizing of the pinion gear 62 is important as it affects various performance characteristics as discussed in detail below.

Figure 12:
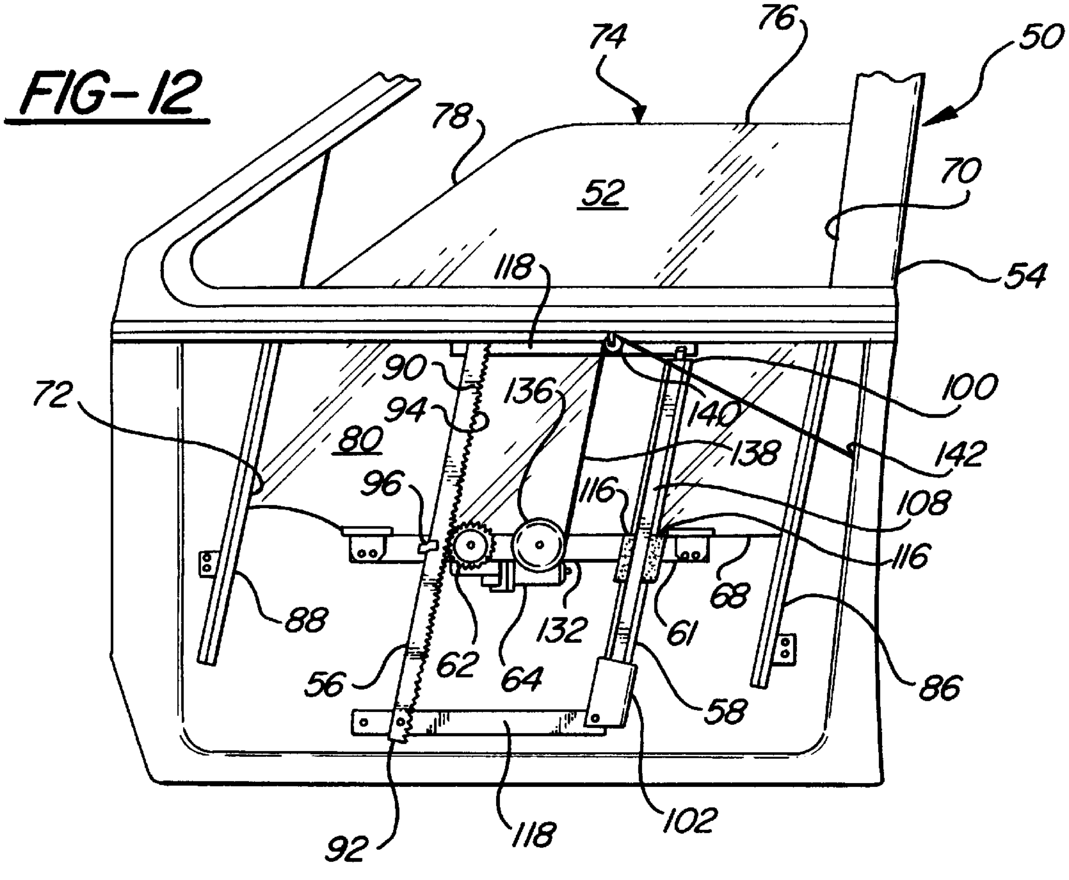
FIG. 12 is a perspective view of the first embodiment of the present invention including a separate clock-spring mechanism.

Alternatively, as shown in FIG. 12 the clock spring 132 can be placed within a separate housing 136 with a first end of the clock spring 132 joined to the housing 136 and a second end joined to a cable 138. The cable 138 extends vertically from the clock spring 132 to a small pulley 140 and then generally horizontally from the pulley 140 to an attachment point 142 on the door 54. The cable 138 is retractable within the housing 136 during the upstroke of the window 52.

Figure 8:
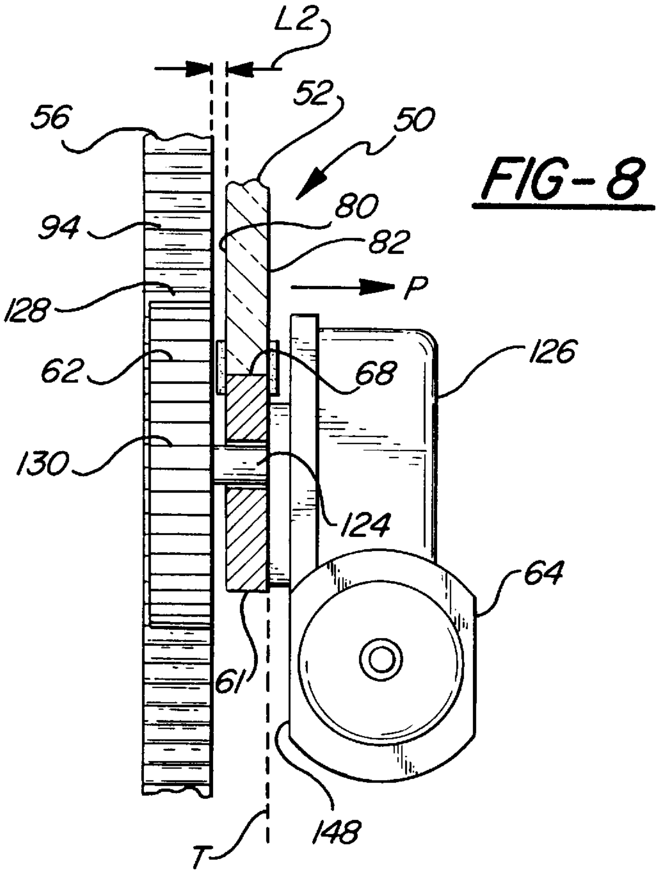
FIG. 8 is a cross-sectional side view of the first embodiment of the present invention.

As shown best in FIG. 8, the support bracket 61 supports the pinion gear 62 on a first side of the window 52 and the motor 64 is supported on a second side of the window 52. Because portions of the motor 64 and/or the pinion gear 62 may be below the bottom edge 68 of the window 52, it could also be said that the support bracket 61 supports the pinion gear 62 on a first side of a plane tangent to the outer surface 82 of the window 52 at the bottom edge 68 thereof. The plane is designated by the letter T in FIG. 8. More specifically, the pinion gear 62 is supported immediately adjacent the inner surface 80 of the window 52 and the outer hub 128 overlaps the bottom edge 68 of the window 52. Similarly, it could be also be said that the motor 64 is supported on a second side of the plane T tangent to the window 52 including a center of gravity indicated at 146 located adjacent the outer surface 82 of the window 52. Obviously, the location and orientation of the plane T will change as the window 52 moves along the movement path M. The motor 64 includes an inside edge 148 which is adjacent to the outer surface 82 of the window 52. Preferably, the inside edge 148 is as close as possible to the outer surface 82 of the window 52 without extending beyond the outer surface 82.

Figure 8A:
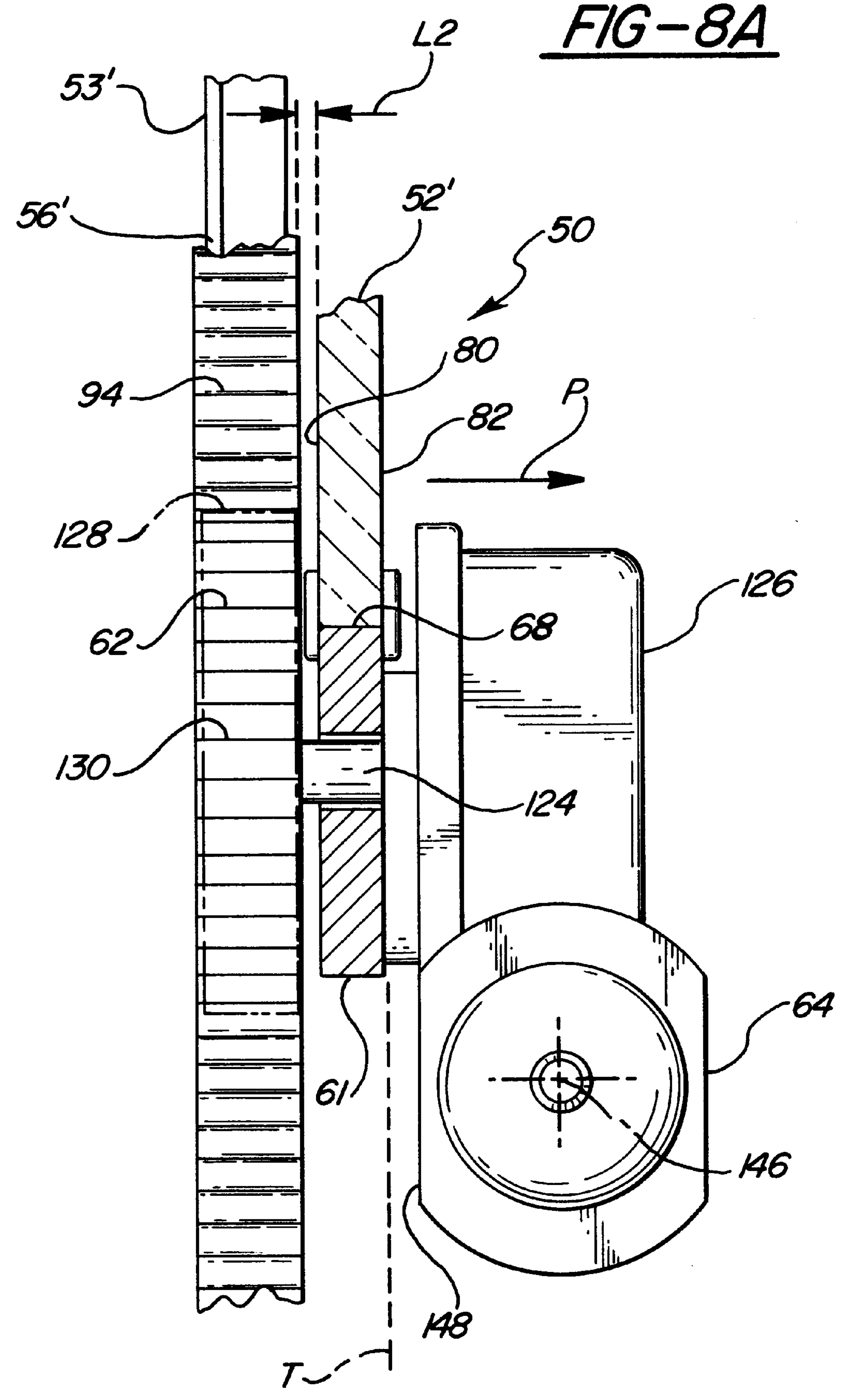
FIG. 8A is a cross sectional side view of the first embodiment of the present invention including a planar closure member.

The present invention can also be utilized in a closure assembly with a planar window 52' (shown in FIG. 8A), such as a sunroof, as opposed to a curved window 52. In this type of assembly, the motor 64 and pinion gear 62 will be positioned in the same relative positions with respect to a planar window 52' as a curved window 52. In other words, the pinion gear 62 will be located immediately adjacent the window 52' on a first side of a plane T defined by the window 52', and the motor 64 will be located on a second side of the plane T defined by the window 52'. The guide track 58' and rack 56' will remain positioned immediately adjacent the window 52' but will be straight, as opposed to curved, to match the planar configuration of the window 52'.

Figure 11:
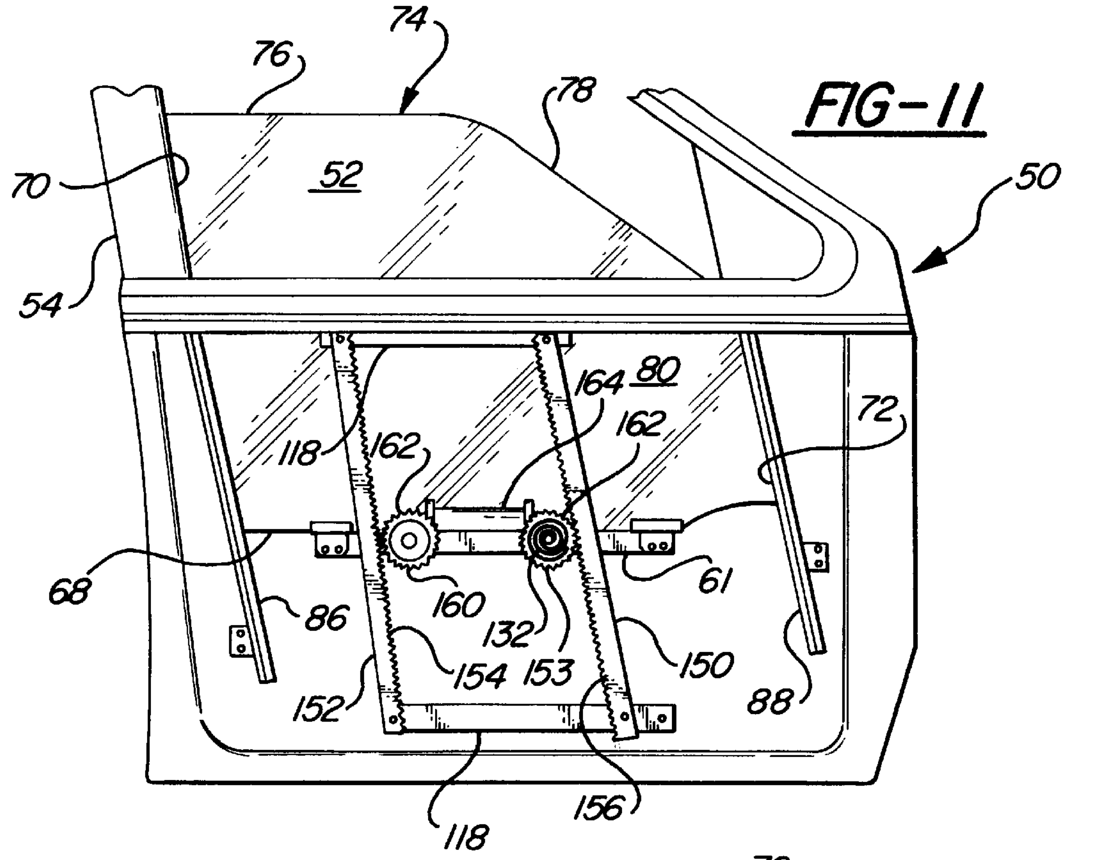
FIG. 11 is a perspective view of a second embodiment of the present invention including two separate racks mounted to a vehicle door.

FIG. 11 illustrates a second embodiment of the invention including first and second racks 150,152 instead of the guide track 58 and rack 56 of the first embodiment. The first rack 150 is identical to the rack 56 in the first embodiment, and the second rack 152 is essentially identical to the first rack 150 and is made from the same material as the first rack 150, includes the same curvature (or lack thereof) as the first rack 150 to correspond to the contour of the window 52, and is parallel to the first rack 150 and positioned immediately adjacent the inner surface 80 of the window 52. The second rack 152 also includes a vertical row of teeth 154 facing toward the second side edge 72 of the window 52 and toward the teeth 156 on the first rack 150. FIG. 11 illustrates the closure assembly 50 on a driver-side door of a vehicle as opposed to a passenger-side door shown in FIGS. 6 and 12.

Figure 14:
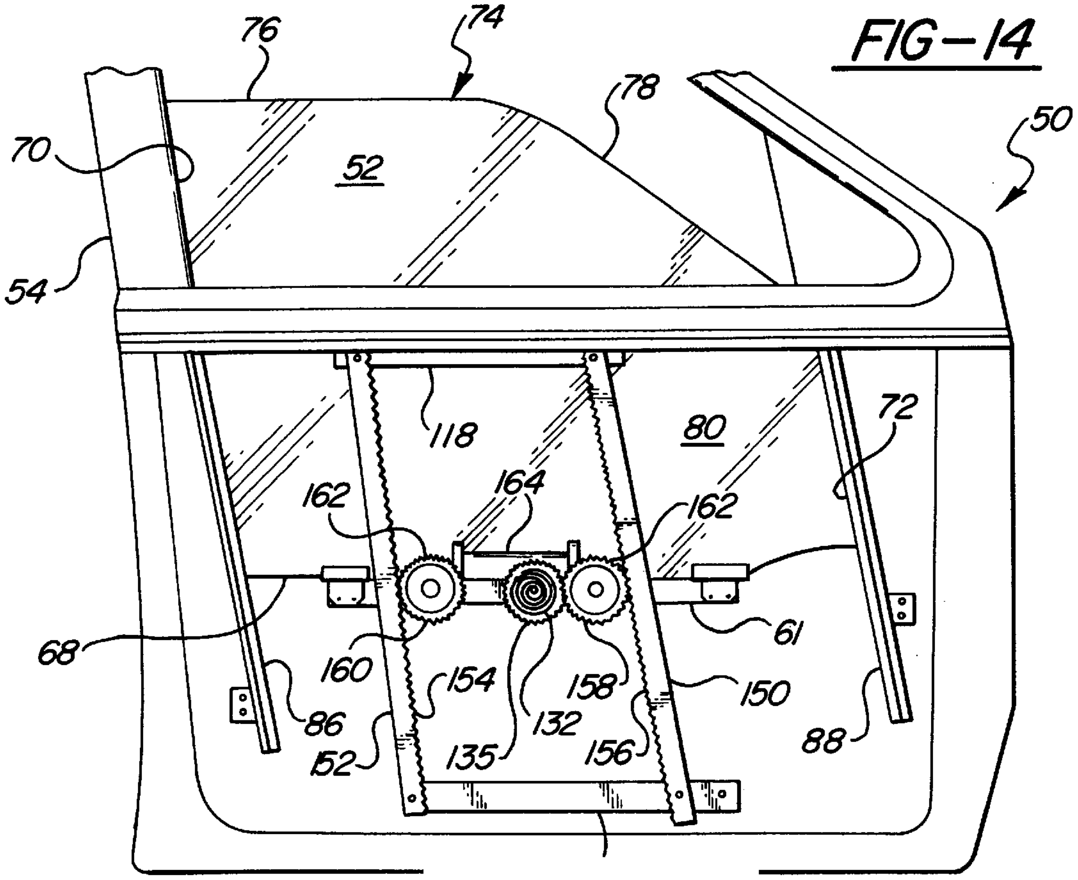
FIG. 14 illustrates the second embodiment of the invention including a supplemental gear with a clock spring engaged with the pinion gear.

In the second embodiment, first and second pinion gears 158,160 are supported in spaced locations on the support bracket 61 and include teeth 162 in engagement with the teeth 156,154 on the first and second racks 150,152, respectively. One or both pinion gears 158,160 can also be provided with clock springs 132 as in the first embodiment. Similarly, the clock spring 132 can be mounted in a supplemental gear 135 engaged with one of the pinion gears 158,162 as shown in FIG. 14. In all other material respects, the pinion gears 158,160 of the second embodiment are the same as the pinion gear 62 of the first embodiment.

One of the primary advantages of the second embodiment is that the torque at the interface between the rack and pinion gear is spread out among two separate racks 150,152 and pinion gears 158,160. As such, the materials used for the racks 150,152 and pinion gears 158,160 need not be as strong in the first embodiment with a single rack 56 and pinion gear.

The motor 164 in the second embodiment includes twin output shafts (not shown) having opposite helical angles and extending from opposing sides of the motor 164 each including a worm gear (not shown) in engagement with a driven gear (not shown). Similar to the first embodiment, each driven gear includes a central shaft joining the driven gear to a corresponding pinion gear 158,160.

A third embodiment of the invention includes a single rack without a guide track 58 or a second rack 152. The third embodiment is otherwise identical to the first embodiment shown in FIG. 6, including the position of the rack approximately 2–5 inches from the center of gravity 84 of the window 52 between the center of gravity 84 and the second side edge 72 of the window 52.

Two primary design concerns in a window lift system are to minimize the noise during operation of the assembly and to minimize the overall weight of the assembly. One way to reduce noise is to minimize the RPMs required by the motor 64 during operation. This is accomplished in the present invention by selecting appropriate sizes for the pinion gear 62 and driven gear 122. Reduction of the motor RPMs also reduces the shock placed on the system when the window 52 reaches a fully open or fully closed position. To reduce the weight of the assembly, the present invention is designed to minimize the torque required from the motor 64 and, hence, the required size of the motor 64.

Selecting the proper sizes for the pinion gear 62 and driven gear 122 is a complex process because the sizes must be selected to obtain the proper balance of low RPMs, sufficient horsepower required from the motor 64, low shock on the pinion gear teeth 130, and low weight of the system. Reducing the size of the driven gear 122 is one way to improve the gear ratio between the worm gear 120 and the driven gear 122 and, hence, reduce the RPMs required from the motor 64. The horsepower required from the motor 64 is directly proportional to the required RPMs and torque such that the Horsepower (HP)=(Torque * RPM)/a constant. Thus, improving the gear ratio reduces the RPMs and, hence, the required horsepower. Reducing the driven gear 122 size will also necessarily reduce the weight of the system.

The shock observed by the driven gear 122 during stoppage is a product of the torque multiplied by the motor RPMs. For a given window system, this value must always be a constant and is directly proportional to the motor speed. To minimize failure due to shock, the shock on the gear teeth should be kept to a minimum and the worm gear speed should also be minimized. To optimize the material usage and minimize motor speed, noise, and shock, the driven gear 122 should be as small as possible, with a practical lower limit of 1 inch in diameter, and the pinion gear 62 should be approximately equal to or larger than the driven gear 122.

Increasing the size of the pinion gear 62 will require fewer revolutions for the same distance of travel relative to the rack 56, resulting in a reduced pinion gear speed. Because the pinion gear 62 and driven gear 122 are joined by the central shaft 124, a reduction in the pinion gear speed will cause a corresponding reduction in both the driven gear speed and, hence, motor speed with a consequential reduction in noise and shock. On the other hand, decreasing the size of the pinion gear 62 results in reduced torque and load at the expense of increased motor speed.

Experimentation has demonstrated that a direct drive rack and pinion system, as in the present invention, is four to five times more efficient in terms of torque requirements and weighs less than half a conventional scissor-type system. This efficiency may be further enhanced by utilizing stored energy from the clock springs 132. In essence, the clock spring 132 stores the gravitational potential energy lost by the window 52 as the window 52 is moved downward and later releases this stored energy to assist upward motion during the upstroke. As such, the motor 64 is required to supply less energy while maintaining control of the speed of operation.

For example, for a window having a closure distance of 20 inches and a desired closure time of 4 seconds, prior art systems have approximately utilized a 2 inch diameter driven gear, a 60:1 gear ratio between the worm gear and the driven gear, and a 0.75 inch diameter pinion gear. This results in a pinion and driven gear free speed of 127.5 RPM, a worm gear (and motor) RPM of 7650, and a generally noisy system. By contrast, the present invention typically utilizes a 1 inch diameter driven gear, a 30:1 gear ratio between the worm gear and the driven gear, and a 1 inch diameter pinion gear. This results in a pinion and driven gear RPM of approximately 87.5 and a worm gear (and motor) RPM of approximately 2625.

A further increase in the size of the pinion gear 62 will yield an additional reduction in the RPM requirements of the motor 64 and worm gear 120. However, as the diameter of the pinion gear 62 increases, the torque required from the motor 64 also increases due to increased torque required at the interface between the rack 56 and pinion gear 62. With the clock spring 132 of the present invention in the pinion gear 62, supplemental torque is provided on the upstroke of the window, reducing the required torque output from the motor 64 and, hence, the size of the motor 64.

For example, the system with a clock spring could include a 1 inch diameter driven gear, a 30:1 gear ratio between the worm gear and the driven gear, and a 3 inch diameter pinion gear. This would result in a pinion gear and driven gear RPM of 32 and a motor and worm gear RPM of 900. It is expected that a 40 to 45 inch-pound torque motor could be used in a system with a clock spring as compared to a 60 inch-pound torque motor in a system without a clock spring. Both embodiments are a significant improvement over present day systems in which a 125 inch-pound torque motor is required. An additional advantage of the present invention is that, due to the reduced shock on the driven gear, that the need for an integral shock absorber within the driven gear is eliminated. In this way the driven gear and pinion gear may be injection molded as one piece, further simplifying the system and subsequent assembly. The following is a table summarizing the comparative gear sizes and RPM requirements for the examples discussed above.

TABLE 1

Calculated parameters for closing a window in 4 seconds using vertical Rack and Pinion Systems.
Closure distance is 20 inches, Closure time is 4 seconds.

| | Relative Torque | Armature Speed RPM | Gear Size (Ins) | Gear Ratio | Pinion Size (Ins) | Pinion Speed (RPM) | Driven Gear (RPM) | COMMENT |
|---|---|---|---|---|---|---|---|---|
| A | 12.5 | 7650 | 2[a] | 60 | 0.75 | 127.5 | 127.5 | Prior art rack and pinion |
| B | 36.6 | 2625 | 1[b] | 30 | 1.0 | 87.5 | 87.5 | Present invention without clock spring |
| C | 100. | 900 | 1[b] | 30 | 3.0 | 32.0 | 32.0 | Present invention with clock spring |

[a]A 2 in. driven gear is a practical lower size limit when an integral shock mechanism is required.
[b]A 1 in. driven gear is a practical lower size limit for the application.

In terms of the gear sizes and gear ratios, several preferred arrangements have been derived. In a first system without a clock spring 132 and including a single rack 56 and a separate guide track 58, a driven gear 122 having a diameter between 0.75 and 1.5 inches is provided and a driven gear 122 to pinion gear 62 diameter ratio of between 2:1 and 1:4 is provided. In a similar system with a clock spring 132, a driven gear 122 to pinion gear 62 diameter ratio of between 1:4 and 1:2 is provided.

In another system without a clock spring 132 and with two separate racks 150,152 with meshing pinion gears 158,160 driven by a double ended motor 164, a driven gear with a diameter between 0.75 and 1.5 inches is provided and a driven gear to pinion gear 158,160 ratio between 2:1 and 1:4 is provided. In a similar system with a clock spring 132 in each pinion gear 158,160, a driven gear to pinion gear 158,160 ratio between 1:4 and 1:2 is provided.

The total weight of the first embodiment of the window lift assembly including the rack 56, support bracket 61, guide track 58, slide 60, motor 64, and pinion gear 62 is expected to be in the range of 2.5 to 3.5 pounds. This results in a significant weight reduction over prior art rack and pinion systems. In particular, a 50% to 60% weight reduction is provided over the prior art "scissor" type systems.

Figure 13:
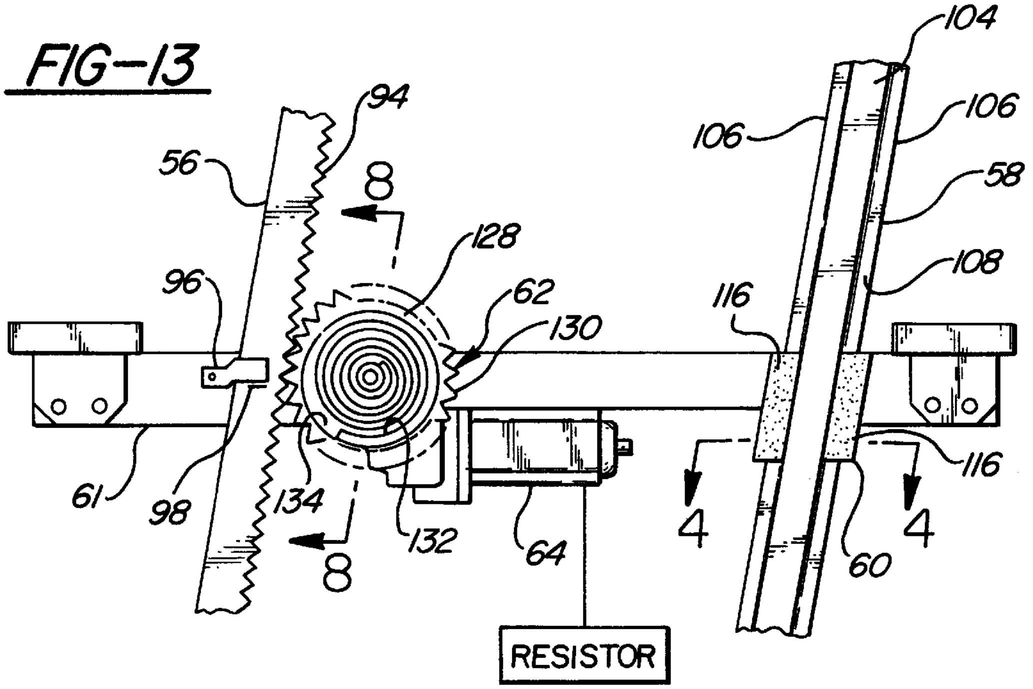
FIG. 13 illustrates the first embodiment of the invention including a diagrammatic illustration of a resistor engaged with the motor.

In operation, it generally takes longer for the window 52 to be raised than lowered because the motor 64 must work against the weight of the window 52, motor 64, and other components supported by the window 52. However, it is desirable to design a window lift system in which it takes an equal amount of time for the window 52 to be raised and lowered. In a system with a clock spring 132, the spring 132 may be selected and pre-loaded so that the spring 132 decreases the upstroke time to be equal to the downstroke time. The spring 132 can be preset so that its medium energy delivered in the upstroke would be equal to one-half the sum of the force required to push the window 52 up into a sealed position plus the force required to drive the window 52 down. These are all readily measurable forces for any particular window system. In lieu of the clock spring 132, the upstroke and downstroke times may be matched by placing a suitable resistor 166 (shown diagrammatically in FIG. 13) in series with the motor 64 when the window 52 is in the downstroke to provide an additional electrical load to slow the downstroke speed of the motor 64.

During operation, the torque at the interface between the rack 56 and pinion gear 62 places a moment on the window 52. The moment is applied at the bottom edge of the window 52 at the support bracket 61 and places a twisting force on the window 52 which increases the friction between the window 52 and the guide slots 86,88, requiring more torque from the motor 64 to move the window 52. The magnitude of the moment depends both on the amount of torque as well as the spacing between the center of gravity of the window 84 and the rack 56. Ideally, the inside edge 148 of the motor 64 should be aligned with the window 52 and the rack 56 should be as close as possible to the inner surface 80 of the window 52 such that the distance L2, as shown in FIG. 8, will be reduced by half a motor width compared to systems in which the motor 64 is centered below the window 52. Preferably, the distance L2 is one-quarter inch or less to achieve maximum benefit from the present invention. This arrangement of the rack 56 and motor 64 relative to the window 52 will reduce the angular moment on the window 52 and, hence, the required torque from the motor 64. Experimentation with the closure assembly 10 of the present invention has established that there is considerably less tendency for the window bracket and motor 64 to "pull-in" as represented by the arrow labeled P in FIG. 8.

The weight of the motor 64 also creates a moment on the window 52 if the center of gravity of the motor 64 is spaced from the window 52. Although prior systems have eliminated this problem by aligning the center of gravity of the motor 64 beneath the window 52, such an arrangement effectively prevents the rack 56 from being positioned immediately adjacent the window 52. More specifically, as shown in FIG. 8, the pinion gear 62 is spaced from the motor 64 a fixed distance depending upon the length of the central shaft 124 joining the driven gear 122 and the pinion gear 62. In the present invention, the pinion gear 62 is placed immediately adjacent the window by positioning the motor 64 on the opposite side of the window 52 as the pinion gear 62. In this manner, the center of gravity of the motor 64 can be maintained close to the center of gravity 84 of the window 52 to reduce the moment caused by the weight of the motor 64 while still preserving the benefit of having the rack 56 and pinion gear 62 immediately adjacent the window 52.

Figure 1:
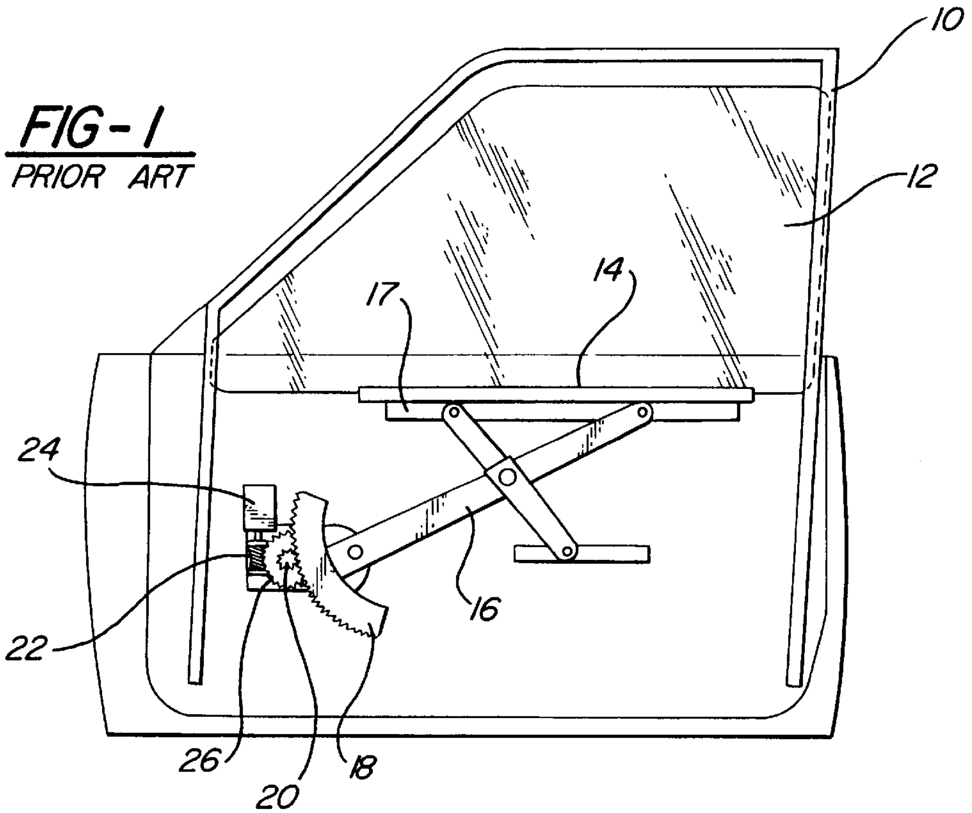
FIG-1 PRIOR ART
FIG. 1 is a perspective view of a prior art scissor-type window lift assembly.
Figure 2:
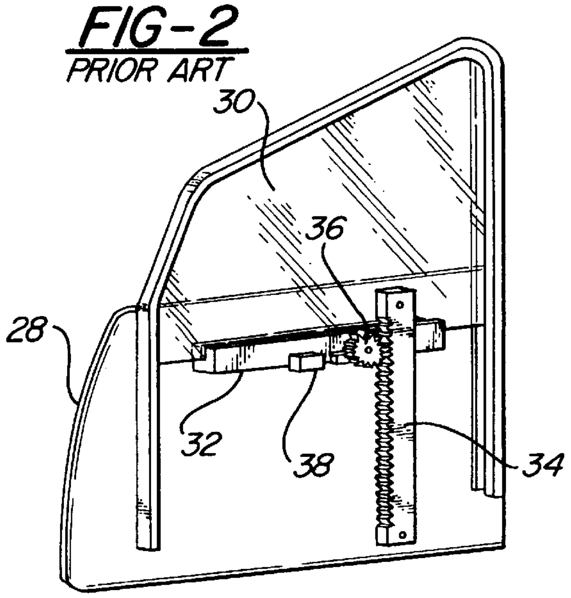
FIG-2 PRIOR ART
FIG. 2 is a perspective view of a first prior art rack-and-pinion window lift assembly.
Figure 3:
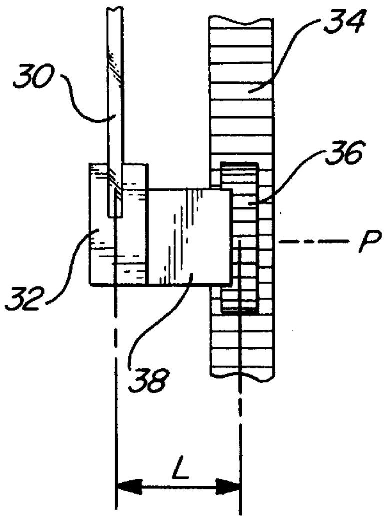
FIG-3 PRIOR ART
FIG. 3 is a cross sectional view of a first prior art rack-and-pinion window lift assembly.
Figure 4:
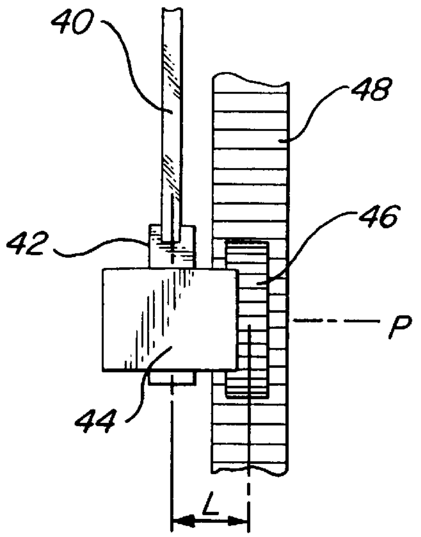
FIG. 4 is a cross sectional view of a second prior art rack-and-pinion window lift assembly.
Figure 5:
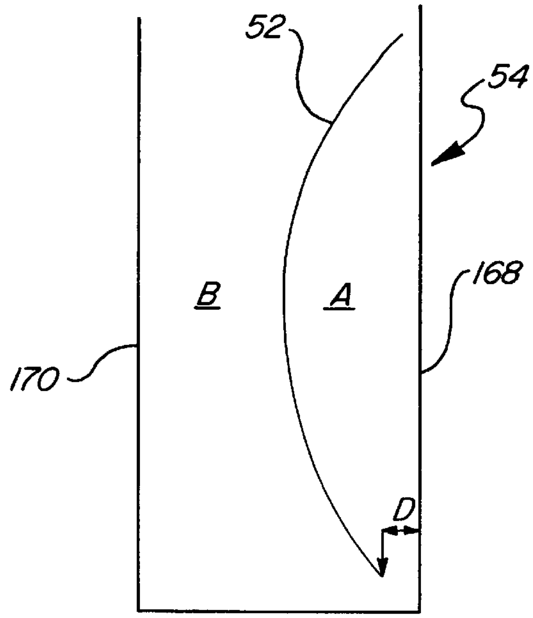
FIG. 5 is a schematic cross sectional view of a vehicle door including a window.

FIG. 5 illustrates another advantage of the present invention over the prior art. FIG. 5 is a cross-sectional view of a door 54 including an inside surface 168, an outside surface 170, and a window 52. The window 52 divides the space within the door 54 into regions labeled A and B. To minimize the thickness of the door 54, the distance D between the window 52 and inside surface 168 of the door 54 should be minimized. In the prior art, either the entire drive mechanism was placed in region A or the rack plus a half of the motor width was placed in region A, making distance D larger than necessary. In the present invention, the distance D is minimized by placing the rack 56 immediately adjacent the inner surface 80 of the window 52 and by positioning the motor 64 on the outside surface 82 of the window 52.

Although the present invention minimizes the torque placed on the window 52 as discussed above, the torque that remains will create a displacement force tending to displace the window 52 in a direction perpendicular to the inner surface 80 of the window 52. In prior art systems, the rack and pinion are prevented from relative movement in a direction perpendicular to the inner surface of the window. Without freedom of movement in this direction, the displacement force will significantly increase the friction between the rack and pinion and, hence, increase the required torque from the motor. The displacement force can also cause jamming and binding between the rack and pinion if no relative movement is permitted. In the present invention, the rack 56 is designed to permit relative movement between the gear teeth 94 on the rack 56 and the gear teeth 130 on the pinion gear 62 by eliminating any structure at opposing ends of the rack teeth 94 which would interfere with movement of the pinion gear teeth 130. Alternatively, this could be accomplished by reducing the relative width of the pinion gear teeth 130 with respect to the rack teeth 94 to permit relative movement therebetween. As shown in FIG. 9, the guide track 58 and slide 60 are also designed to allow movement in the thickness direction of the door 54 (perpendicular to the inner and outer surfaces 80,82 of the window 52) while restricting movement in the breadthwise direction (toward the side edges 70,72 of the window 52).

As can be seen from FIG. 6, the first side edge 70 of the window 52 is longer than the second side edge 72. This difference in length can also cause a performance problem in window-lift systems. Specifically, as the side edges 70,72 travel in the guide slots 86,88, the increased length of the first side edge 70 will result in greater friction between the first side edge 70 and the first guide slot 86 than between the second side edge 72 and guide slot 88. During the upstroke of the window 52, the window 52 will tend to take the path of least resistance by pulling away from the first guide slot 86, causing the window 52 to pivot toward the second guide slot 88. If the side edges 70,72 of the window 52 were of equal length, pivoting would be effectively precluded but, unfortunately, the shorter second edge 72 of the window 52 provides a "pivot point" for the window 52. In prior art systems with a rigid rack, binding can occur between the rack and pinion due to the inability of the rack to compensate for any side-to-side motion of the pinion gear caused by pivoting motion of the window. The flexible rack 56 of the present invention eliminates this problem by permitting movement of the rack 56 in a direction perpendicular to the rack 56 and parallel to the window 52.

The invention has been described in illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A closure assembly comprising:

a rack;

a pinion gear operatively engaged with said rack;

a curved closure member;

said pinion gear being supported by said closure member and positioned on a first side of said closure member;

said rack and said pinion gear being located immediately adjacent said closure member;

a motor supported by said closure member including an output shaft connected to said pinion gear; and said entire motor being located on a second side of said closure member.

2. The closure assembly of claim 1 wherein:

said closure member includes a concave side and a convex side and said motor is positioned adjacent said convex side of said closure member and said pinion gear is positioned adjacent said concave side of said closure member.

3. The closure assembly of claim 1 wherein said rack is stationary, said assembly further comprising:

a guide track non-integral with said rack and spaced from said rack;

said guide track being parallel to said rack; and a slide supported by said closure member and operatively engaged with said guide track.

4. The closure assembly of claim 3 wherein said pinion gear comprises:

an axle;

an outer hub including a plurality of gear teeth circumferentially disposed thereabout; and a clock spring including a first end joined to said axle and a second end joined to said outer hub and adapted to provide supplemental torque to said pinion gear during travel along the length of said rack.

5. The closure assembly of claim 3 further comprising:

frame means for supporting said rack;

a clock spring housing supported on said closure member;

a clock spring supported within said clock spring housing;

said clock spring including a first end joined to said clock spring housing;

said clock spring including a second end joined to a first end of a cable;

said cable including a second end joined to said frame means.

6. The closure assembly of claim 3 wherein said closure member has a width and said guide track and said rack are spaced apart a distance approximately one-fourth said width of said closure member.

7. The closure assembly of claim 1 wherein said pinion gear comprises:

an axle;

an outer hub including a plurality of gear teeth circumferentially disposed thereabout; and a clock spring including a first end joined to said axle and a second end joined to said outer hub and adapted to provide supplemental torque to said pinion gear during travel along the length of said rack.

8. The closure assembly of claim 7 further comprising:

a worm gear connected to said output shaft of said motor;

a driven gear operatively engaged with said worm gear;

a central shaft joining said driven gear and said pinion gear;

said driven gear having a diameter between 0.75 and 1.5 inches; and said driven gear and said pinion gear having a diameter ratio between 2:1 and 1:4.

9. The closure assembly of claim 8 wherein:

said driven gear has a diameter of approximately 1 inch;

said pinion gear has a diameter of approximately 3 inches; and said worm gear and said driven gear have a gear ratio of approximately 30:1.

10. The closure assembly of claim 1 further comprising:

frame means for supporting said rack;

a clock spring housing supported on said closure member;

a clock spring supported within said clock spring housing;

said clock spring including a first end joined to said clock spring housing;

said clock spring including a second end joined to a first end of a cable;

said cable including a second end joined to said frame means.

11. The closure assembly of claim 1 wherein said rack has a length and is curved to match said curvature of said closure member such that a predetermined distance is maintained between said closure member and said rack along said length of said rack.

12. The closure assembly of claim 1 further comprising frame means for supporting said rack.

13. The closure assembly of claim 1 wherein said closure member is moveable along a movement path in an upstroke and a downstroke, including:

resistor means for providing increased electrical load on said motor during said downstroke of said closure member whereby said upstroke and said downstroke movements occur in substantially equivalent amounts of time.

14. The closure assembly of claim 1 wherein said rack is flexible.

15. The closure assembly of claim 1 wherein said rack is semi-rigid.

16. The closure assembly of claim 1 further comprising:

a worm gear connected to said output shaft of said motor;

a driven gear operatively engaged with said worm gear;

a central shaft joining said driven gear and said pinion gear;

said driven gear having a diameter between 0.75 and 1.5 inches; and said driven gear and said pinion gear having a diameter ratio between 2:1 and 1:4.

17. The closure assembly of claim 16 wherein:

said driven gear has a diameter of approximately 1 inch;

said pinion gear has a diameter of approximately 1 inch; and said worm gear and said driven gear have a gear ratio of approximately 30:1.

18. The closure assembly of claim 1 further comprising:

a supplemental gear supported by said closure member and engaged with said pinion gear;

said supplemental gear including an axle and an outer hub; and a clock spring including a first end joined to said axle and a second end joined to said hub and adapted to provide supplemental torque to said pinion gear during travel along the length of said rack.

19. A closure assembly comprising:

a rack;

a pinion gear operatively engaged with said rack;

a planar closure member;

said pinion gear being supported by said closure member and positioned on a first side of a plane defined by said closure member;

said rack and said pinion gear being located immediately adjacent said closure member;

a motor supported by said closure member;

said motor including an output shaft connected to said pinion gear; and said entire motor being located on a second side of said plane defined by said closure member.

20. The closure assembly of claim 19 wherein said rack is stationary, said assembly further comprising:

a guide track non-integral with said rack and spaced from said rack;

said guide track being parallel to said rack; and a slide supported by said closure member and operatively engaged with said guide track.

21. The closure assembly of claim 20 wherein said pinion gear comprises:

an axle;

an outer hub including a plurality of gear teeth circumferentially disposed thereabout; and a clock spring including a first end joined to said axle and a second end joined to said outer hub and adapted to provide supplemental torque to said pinion gear during travel along the length of said rack.

22. The closure assembly of claim 20 further comprising:

frame means for supporting said rack;

a clock spring housing supported on said closure member;

a clock spring supported within said clock spring housing;

said clock spring including a first end joined to said clock spring housing;

said clock spring including a second end joined to a first end of a cable;

said cable including a second end joined to said frame means.

23. The closure assembly of claim 20 wherein said closure member has a width and said rack and said guide track are spaced apart a distance approximately one-fourth said width of said closure member.

24. The closure assembly of claim 19 wherein said pinion gear comprises:

an axle;

an outer hub including a plurality of gear teeth circumferentially disposed thereabout; and a clock spring including a first end joined to said axle and a second end joined to said outer hub and adapted to provide supplemental torque to said pinion gear during travel along the length of said rack.

25. The closure assembly of claim 24 further comprising:

a worm gear connected to said output shaft of said motor;

a driven gear operatively engaged with said worm gear;

a central shaft joining said driven gear and said pinion gear;

said driven gear having a diameter between 0.75 and 1.5 inches; and said driven gear and said pinion gear having a diameter ratio between 2:1 and 1:4.

26. The closure assembly of claim 19 further comprising:

frame means for supporting said rack;

a clock spring housing supported on said closure member;

a clock spring supported within said clock spring housing;

said clock spring including a first end joined to said clock spring housing;

said clock spring including a second end joined to a first end of a cable;

said cable including a second end joined to said frame means.

27. The closure assembly of claim 19 wherein said rack has a length and is parallel to said closure member such that a predetermined distance is maintained between said closure member and said rack along said length of said rack.

28. The closure assembly of claim 19 further comprising frame means for supporting said rack.

29. The closure assembly of claim 19 wherein said closure member is moveable along a movement path in an upstroke and a downstroke, including:

resistor means for providing increased electrical load on said motor during said downstroke of said closure member whereby said upstroke and said downstroke movements occur in substantially equivalent amounts of time.

30. The closure assembly of claim 19 wherein said rack is flexible.

31. The closure assembly of claim 19 wherein said rack is semi-rigid.

32. The closure assembly of claim 19 further comprising:

a worm gear connected to said output shaft of said motor;

a driven gear operatively engaged with said worm gear;

a central shaft joining said driven gear and said pinion gear;

said driven gear having a diameter between 0.75 and 1.5 inches; and said driven gear and said pinion gear having a diameter ratio between 2:1 and 1:4.

33. The closure assembly of claim 32 wherein:

said driven gear has a diameter of approximately 1 inch;

said pinion gear has a diameter of approximately 1 inch; and said worm gear and said driven gear have a gear ratio of approximately 30:1.

34. The closure assembly of claim 32 wherein:

said driven gear has a diameter of approximately 1 inch;

said pinion gear has a diameter of approximately 3 inches; and said worm gear and said driven gear have a gear ratio of approximately 30:1.

35. The closure assembly of claim 19 further comprising:

a supplemental gear supported by said closure member and engaged with said pinion gear;

said supplemental gear including an axle and an outer hub; and a clock spring including a first end joined to said axle and a second end joined to said hub and adapted to provide supplemental torque to said pinion gear during travel along the length of said rack.

36. A closure assembly comprising:

a closure member including two opposing side edges;

a pinion gear supported by said closure member;

a stationary rack operatively engaged with said pinion gear;

a guide track non-integral with said rack and spaced from said rack;

said guide track and said rack being parallel;

a slide supported by said closure member and operatively engaged with said guide track;

frame means for supporting said rack;

a clock spring housing supported on said closure member;

a clock spring supported within said clock spring housing;

said clock spring including a first end joined to said clock spring housing;

said clock spring including a second end joined to a first end of a cable; and said cable including a second end joined to said frame means.

37. The closure assembly of claim 36 wherein:

said closure member includes a center of gravity;

said closure member includes a first side edge and a second side edge;

said guide track is positioned adjacent said closure member between said first side edge and said center of gravity; and said rack is positioned adjacent said closure member between said second side edge and said center of gravity.

38. The closure assembly of claim 37 wherein said rack is spaced between 2 and 5 inches from said center of gravity of said closure member.

39. The closure assembly of claim 38 wherein said closure member has a width and said rack and said guide track are spaced apart a distance approximately one-fourth said width of said closure member.

40. The closure assembly of claim 38 wherein said slide includes substantially no tolerance about said guide track in a direction parallel to said closure member and perpendicular to said guide track thereby preventing movement of said closure member during said upstroke and said downstroke relative to said guide track in a direction parallel to said closure member and perpendicular to said guide track.

41. The closure assembly of claim 36 wherein:

said closure member is moveable along a movement path in an upstroke and a downstroke; and said slide surrounds said guide track and includes tolerance in a direction perpendicular to said closure member thereby permitting movement of said closure member during said upstroke and said downstroke relative to said guide track in a direction perpendicular to said closure member.

42. The closure assembly of claim 36 wherein said pinion gear comprises:

an axle;

an outer hub including a plurality of gear teeth circumferentially disposed thereabout; and a clock spring including a first end joined to said axle and a second end joined to said outer hub and adapted to provide supplemental torque to said pinion gear during travel along the length of said rack.

43. The closure assembly of claim 36 wherein said rack is flexible.

44. The closure assembly of claim 36 wherein said rack is semi-rigid.

45. The closure assembly of claim 36 further comprising:

a supplemental gear supported by said closure member and engaged with said pinion gear;

said supplemental gear including an axle and an outer hub; and a clock spring including a first end joined to said axle and a second end joined to said hub and adapted to provide supplemental torque to said pinion gear during travel along the length of said rack.

* * * * *